United States Patent
Nakajima et al.

(10) Patent No.: US 6,275,759 B1
(45) Date of Patent: Aug. 14, 2001

(54) AUTOMATIC ENGINE STOP AND RESTART SYSTEM FOR VEHICLE

(75) Inventors: Yuki Nakajima, Yokohama; Masaaki Uchida, Kanagawa; Hiroaki Ogane, Kanagawa; Takahiro Yoshino, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/484,443

(22) Filed: Jan. 18, 2000

(30) Foreign Application Priority Data

Mar. 19, 1999 (JP) .................................................. 11-076223

(51) Int. Cl.[7] .......................... F02D 29/02; B60K 41/00; B60K 1/00
(52) U.S. Cl. ............................. 701/54; 290/34; 123/179.4
(58) Field of Search ........................ 701/1, 54; 290/38 E, 290/40 A, 34; 477/116; 123/179.3, 179.4; 180/65.2

(56) References Cited

U.S. PATENT DOCUMENTS

| 4,286,683 | * | 9/1981 | Zeigner et al. | 180/54.1 |
|---|---|---|---|---|
| 4,364,343 | * | 12/1982 | Malik | 123/179.4 |
| 4,482,812 | * | 11/1984 | Hori et al. | 290/38 R |
| 4,630,577 | * | 12/1986 | Cornacchia | 123/179.3 |
| 5,653,659 | * | 8/1997 | Kunibe et al. | 477/111 |
| 6,093,974 | * | 7/2000 | Tabata et al. | 290/40 R |
| 6,149,544 | * | 11/2000 | Masberg et al. | 477/13 |

FOREIGN PATENT DOCUMENTS 8-291725    11/1996    (JP) .

* cited by examiner

*Primary Examiner*—Michael J. Zanelli
(74) *Attorney, Agent, or Firm*—Foley & Lardner

(57) ABSTRACT

An automatic engine stop and restart system includes an engine, a starting motor, a transmission, a vehicle operating condition sensor and a controller. The controller monitors the vehicle operating condition to produce an automatic engine restart request signal during an automatic engine stop operation, calculates a target engine speed for the automatic engine restart operation, and drives the motor in accordance with the target speed to perform the automatic engine restart operation in response to the engine restart request signal. During the automatic engine restart operation, the transmission is held in a drive state or in a non-drive state invariably.

18 Claims, 5 Drawing Sheets

AUTOMATIC ENGINE STOP AND RESTART SYSTEM FOR VEHICLE

BACKGROUND OF THE INVENTION

The present invention relates to an automatic engine stop and restart system.

Japanese Patent Kokai Publication No. H8(1996)-291725 shows a conventional automatic engine stop and restart system.

SUMMARY OF THE INVENTION

When a vehicle is stopped with an automatic transmission in the drive range, this conventional stop and restart system restarts the engine by forcibly holding the automatic transmission in the neutral range, and shifts the automatic transmission from the neutral range to the drive range when the engine speed reaches an idle speed. Therefore, this system tends to arouse unnatural feeling in the driver by a delay in producing the creep force of the automatic transmission, and produces a torque shock unexpectedly by allowing a torque converter to transmit, to a drive shaft, a torque proportional to the square of the engine speed when the transmission is shifted from the neutral range to the drive range. The torque shock is increased when the vehicle is restarted with the accelerator pedal being depressed.

It is therefore an object of the present invention to provide automatic engine stop and restart apparatus and method for reducing an undesired torque shock in an automatic engine restart operation, and for producing a driving force as demanded by a driver.

According to the present invention, a vehicle comprises: an engine; a motor for starting the engine; an automatic transmission; a sensing device for sensing a vehicle operating condition; and a controller for performing an automatic engine stop operation for automatically stopping the engine and an automatic engine restart operation for terminating the automatic engine stop operation and instead automatically restarting the engine in accordance with the vehicle operating condition. The controller produces an engine restart request signal to request a restart of the engine during the automatic engine stop operation, determines a target engine speed for the automatic engine restart operation, and performs the automatic engine restart operation, in response to the engine restart request signal, by driving the motor in accordance with the target speed while holding a transmission state of the automatic transmission unchanged.

According to one aspect of the present invention, an automatic engine stop and restart control apparatus comprises: first means for automatically stopping the engine in a predetermined vehicle situation; second means for producing an automatic restart request signal in accordance with a vehicle operating condition in the predetermined vehicle situation; third means for monitoring a driving condition of an automatic transmission connected with the engine; fourth means for determining a target engine speed for an automatic engine restart operation in accordance with the driving condition of the automatic transmission; and fifth means for restarting the engine in response to the automatic engine restart request signal, by controlling the starting motor in accordance with the target engine speed.

According to one aspect of the present invention, an automatic engine stop and restart control process comprises: putting the engine in an automatic stop state in a predetermined vehicle situation; producing an automatic restart request signal in accordance with a vehicle operating condition in the predetermined vehicle situation; detecting a driving condition of an automatic transmission connected with the engine; determining a target engine speed for an automatic engine restart operation in accordance with the driving condition of the automatic transmission; and initiating the automatic engine restart operation for restarting the engine in response to the automatic engine restart request signal, by controlling the starting motor in accordance with the target engine speed.

According to one aspect of the present invention, the controller sets the target engine speed for the automatic engine restart operation equal to an idle speed when the transmission is in a non-driving state (such as the N range and the P range) in which a driving torque is not transmitted through the transmission.

DETAILED DESCRIPTION OF THE INVENTION

Figure 1:
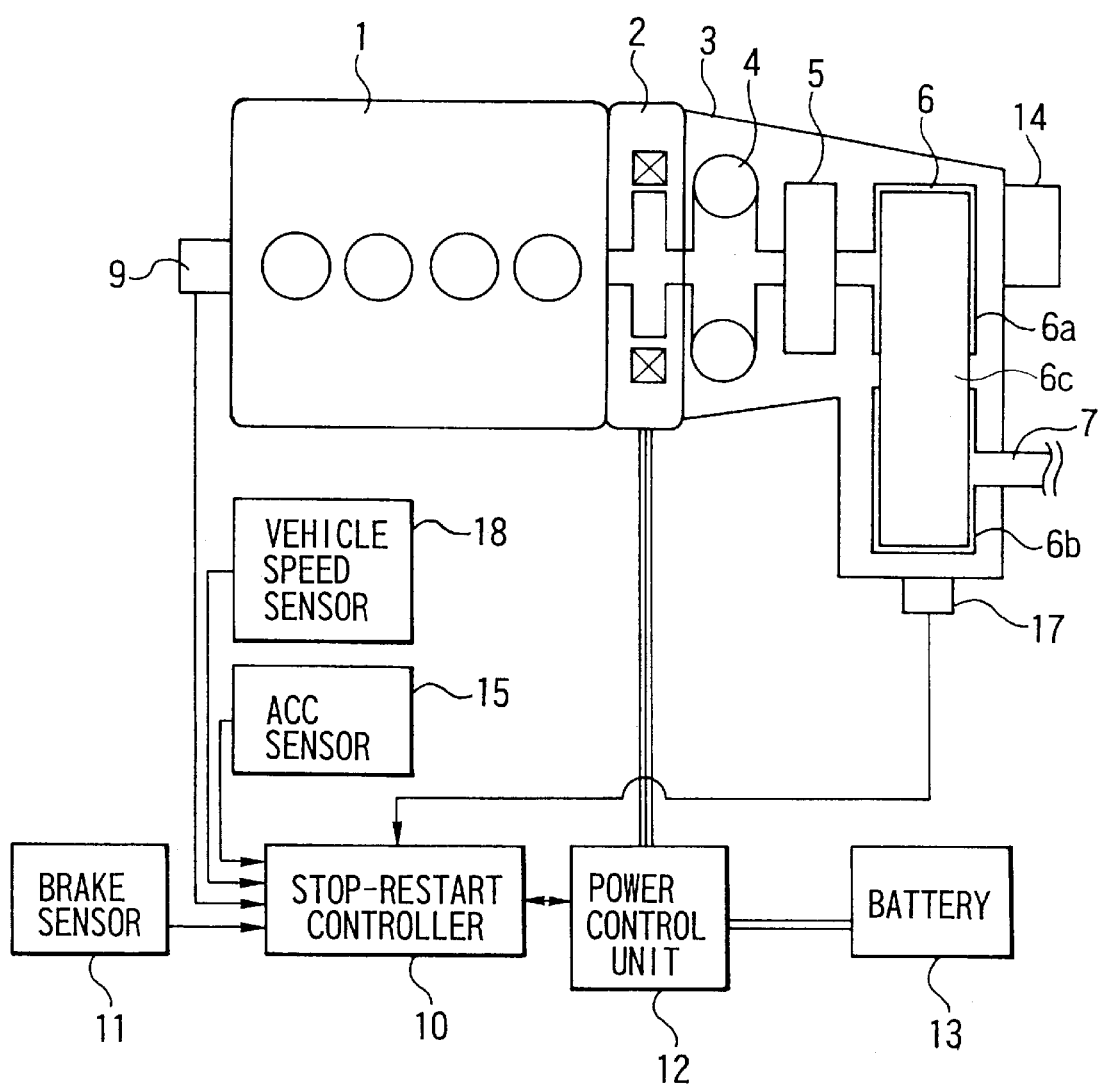
FIG. 1 is a schematic view showing a vehicle equipped with an automatic engine stop and restart system according to one embodiment of the present invention.

FIG. 1 shows a vehicle equipped with an automatic engine stop and restart system according to one embodiment of the present invention.

Between an engine 1 and an automatic transmission 3, there is provided a motor/generator (or motor) 2. The automatic transmission 3 of this example is a continuously variable transmission (CVT). Rotation of the engine 1 or the motor/generator 2 is transmitted through the automatic transmission 3 to a drive shaft 7 for driving drive wheels of the vehicle.

The engine 1 of this example may be a gasoline engine or a diesel engine. The automatic transmission 3 may be a multi-speed automatic transmission having a torque converter or a start clutch, instead of the CVT transmission.

The automatic transmission 3 of this example includes a torque converter 4, a forward-reverse changeover mechanism 5 and a belt type CVT unit 6 having variable pulleys 6a and 6b and a metal belt 6c connecting the pulleys 6a and 6b. The CVT unit 6 can vary the speed ratio between the input speed and the output speed continuously by varying the pulley ratio. The control system determines a target speed ratio in accordance with an operating condition, and controls primary and secondary oil pressures for driving the pulleys 6a and 6b so as to make the actual speed ratio equal to the target speed ratio. An external electric oil pump 14 supplies an oil pressure required for varying the speed ratio. The oil pump 14 can produce the oil pressure and supply the oil pressure to the automatic transmission 3 even when the engine 1 stops rotation. In this example, the oil pump 14 is a motor-driven pump external to the automatic transmission 3.

The forward and reverse changeover mechanism 5 is arranged to change the direction of the output rotation between the forward rotation and the reverse rotation to move the vehicle forwards and backwards. The torque converter 4 transmits torque from the input member to the output member by dynamic fluid action. When the input speed is very low, the torque converter 4 allows the output member to stop rotation.

The motor/generator 2 of this example is directly connected with the crankshaft of the engine 1. Alternatively, it is optional to connect the motor/generator 2 with the engine 1 through a belt drive or a chain drive. The motor/generator 2 rotates in synchronism with the engine 1. The motor/generator 2 can function as an electric motor or a starter motor and as an electric generator. A power control unit 12 controls the operating mode, the speed (rpm) and the power generation quantity of the motor/generator 2.

When the motor/generator 2 serves as a motor to add assisting torque to the output of the engine 1, or to crank the engine 1, current is supplied from a battery 13 through the power control unit 12 to the motor/generator 2. When the motor/generator 2 serves as a generator to absorb running energy of the vehicle, generated current is supplied through the power control unit 12 to charge the battery 13.

An automatic stop and restart controller 10 is a main component of the automatic engine stop and restart system for automatically stopping the engine 1 when the vehicle is stopped temporarily and for automatically restarting the engine 1 to restart the vehicle. The stop and restart controller 10 stops the engine 1 when the vehicle comes to a halt, and restarts the engine 1 with the motor/generator 2 to restart the vehicle.

The stop and restart controller 10 receives input information on vehicle operating conditions from an engine speed sensor 9, a brake sensor 11, an accelerator sensor 15, a select position sensor 17 for sensing a select position of the automatic transmission 3, and a vehicle speed sensor 18. In accordance with signals from these sensors, the stop and restart controller 10 performs the automatic engine stop and restart control. Specifically, the stop and restart controller 10 according to this embodiment of the invention performs an automatic engine restart operation with the motor/generator 2 while the automatic transmission 3 is in the state capable of transmitting engine rotation therethrough. By so doing, this restart system produces the driving force and the creep force as expected by the driver in restarting so as to avoid unnatural feeling, and reduces a shock in restarting.

Figure 2:
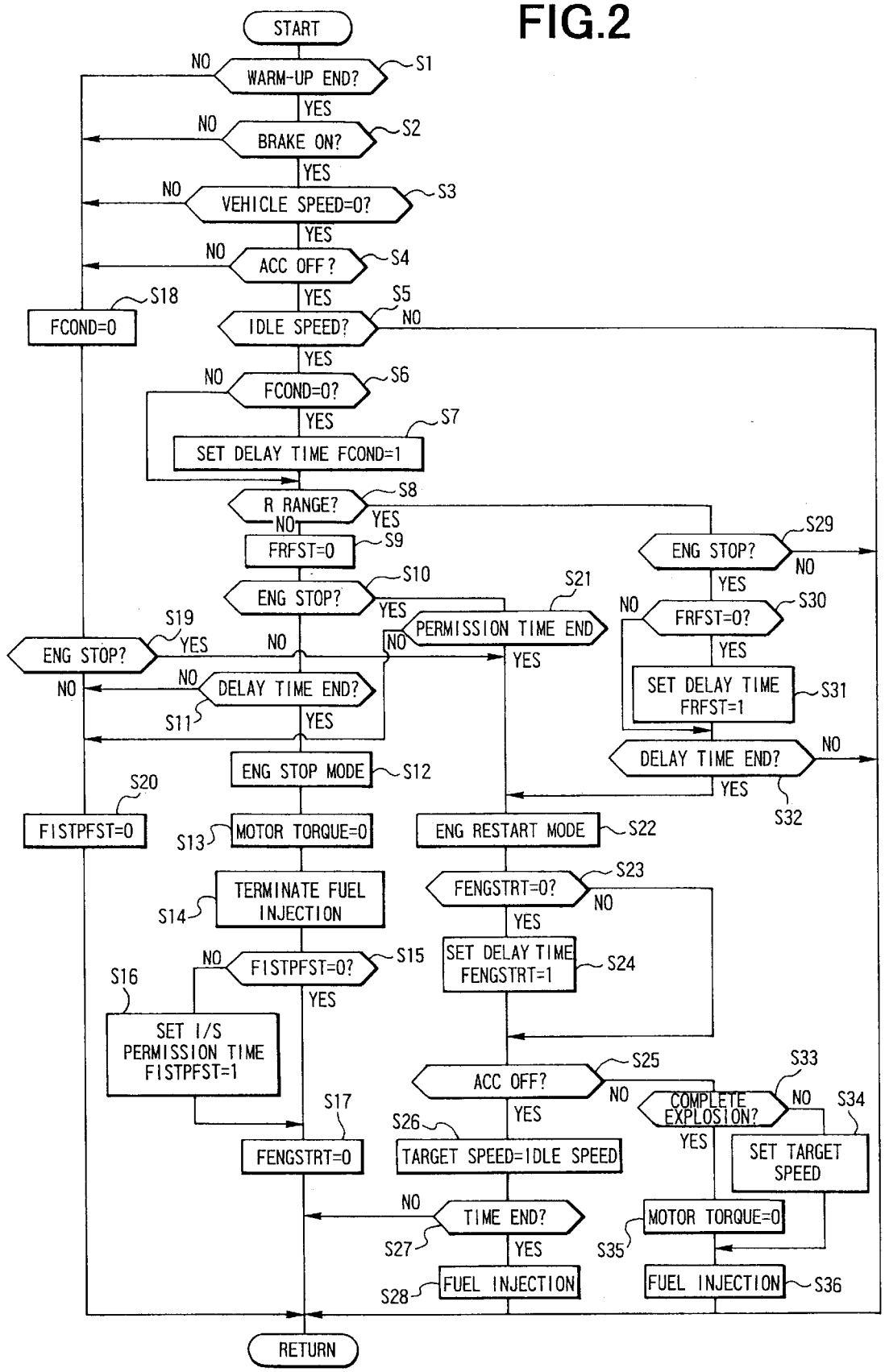
FIG. 2 is a flowchart for showing a control process performed by the automatic engine stop and restart system of FIG. 1.

FIG. 2 shows an automatic stop and restart control process performed by the stop and restart controller 10. This process is performed after the warm-up operation of the engine. When, for example, the vehicle is stopped at a crossing, this system automatically stops the engine 1 and restarts the engine 1.

At a step S1, the controller 10 checks if the engine warm-up operation is completed and the engine 1 is in a warmed-up state. Then, at steps S2~S5, the controller 10 further checks the conditions of the brake pedal, the vehicle speed, the accelerator pedal and the engine speed. The controller 10 proceeds to a step S6 if the engine 1 is in the warmed-up state, the brake pedal is depressed, the vehicle speed is zero, the accelerator pedal is released, and the engine speed is in an idling range (for example, equal to or lower than 800 rpm). At the step S6, the controller 10 checks if these conditions are satisfied for the first time, by checking if FCOND=0.

When FCOND=0, the controller 10 sets a stop delay time for delaying a stoppage of the engine 1, and sets FCOND to one (FCOND=1) at a step S7. After the step S7, the controller 10 proceeds to a step 58. For example, the stop delay time is equal to 2 seconds. This system stops the engine 1 at the end of the delay time starting from the time point at which all the conditions are first satisfied. When FCOND=1, the controller 10 proceeds from the step S6 directly to the step S8.

At the step S8, the controller 10 examines the shift position of the automatic transmission 3. When the shift position is not the R range, then the controller 10 resets a flag FRFST to zero (FRFST=0) at a step S9 to initiate an automatic stop operation. Then, the controller 10 checks, at a step S10, whether the engine 1 is in a stop state, or not. In this example, the automatic stop and restart operation is performed not only in the D range, but in the L range, S range, N (neutral) range and P (parking) range as well.

If the engine 1 is not stopped, the controller 10 proceeds from the step S10 to a step S11, and checks, at the step S11, if the delay time has elapsed. When the delay time has elapsed from the time point at which all the conditions of the steps S1~S5 become satisfied, the controller 10 enters the program section S12~S17 for the automatic engine stop operation.

In the engine stop mode for automatically stopping the engine 1, the controller 10 reduces the torque of the motor/generator 2 to zero at the step S13, and stops the fuel injection for the engine 1 at the step S14. Then, at the step S15, the controller 10 checks if FISTPFST=0, to examine whether this is the first operation in the automatic engine stop mode. When the current execution is the first execution of the engine stop mode, the controller 10 proceeds from the step S15 to the step S16, at which the controller 10 sets an idling stop permission time, and sets the flag FISTPFST to one (FISTPFST=1) to indicate the setting of the idling stop permission time. At the step S17, the controller 10 resets a flag FENGSTRT to zero (FENGSTRT=0) to indicate that the engine 1 is in the automatic stop state. Thus, the engine 1 is put in the stop state.

When any one or more of the conditions of the steps S1~S4 become unsatisfied, the controller proceeds to a step S18. That is, the controller proceeds to the step S18 if the engine 1 is not in the warmed-up state, or if the brake pedal is released, or if the accelerator pedal is depressed, or if the vehicle speed becomes greater than zero. The controller 10 resets the flag FCOND to zero (FCOND=0) to indicate that the engine stop condition becomes unsatisfied at the step S18, and checks, at a step S19, whether the engine 1 is in the stop state. When the engine 1 is in the stop state, the controller 10 proceeds from the step S19 to a step S22 to restart the engine 1.

When the engine 1 is not in the stop state, the controller 10 proceeds from the step S19 to a step S20, and resets the idling stop permission flag FISTPFST to zero (FISTPFST=0) at the step S20.

When the engine stop condition is satisfied, and the engine 1 is already in the stop state, the controller 10 proceeds from the step S10 to a step S21, and examines if the idling stop permission time (set at the step S16) has elapsed. When the idling stop permission time has elapsed, the controller 10 initiates the automatic engine restart operation of steps S22~528 and S33~S36.

The controller 10 initiates the automatic engine restart operation at the step 522, and checks whether this is the first operation in the automatic engine restart mode, by checking whether FENGSTRT=0 at the step S23. In the case of the first operation (FENGSTRT=0), the controller 10 sets a restart delay time and sets FENGSTRT to one (FENGSTRT=1) at the step S24. The restart delay time is set equal to a time (1.5 second, for example) required to develop an intake boost to a level of about −400 mmHg (≅48 kPa) in restarting. During this restart delay time, the system cranks the engine 1 without injecting fuel, and thereby obtains a smooth engine starting operation.

At the step S25, the controller 10 checks if the accelerator pedal is in the off (non-depressed) state. In the case of a restart with the accelerator pedal being in the non-depressed state, the controller 10 sets a target engine speed at an idle speed (the target speed=the idle speed) at the step S26, and waits for the elapse of the restart delay time at the step S27. Then, the control system starts the fuel injection at the step S28.

When the accelerator pedal is depressed, the controller 10 proceeds from the step S25 to the step S33 and checks if the engine 1 is in a complete explosion state. When the engine 1 is in the complete explosion state, the controller 10 proceeds to the step S35, and performs the torque control of the motor/generator 2 to reduce the motor torque to zero. It is possible to detect the complete explosion state of the engine, for example, by examining if the engine speed reaches a predetermined level.

When the engine 1 is not in the complete explosion state, the controller 10 proceeds to the step S34, sets the target engine speed, and cranks the engine 1 with the motor/generator 2. In this case, the control system determines the target engine speed from a target driving force, or from the accelerator opening (degree) and the time from a start of an engine starting operation, as a function of the accelerator opening and the time from the start of the engine starting operation, and controls the revolution speed of the motor/generator 2.

Then, the control system starts the fuel injection at the step S36.

The target driving force produced by the motor/generator 2 in place of the engine 1 is a driving force corresponding to the force of creep when the automatic transmission 3 is driven by the engine 1 through the torque converter 4.

The output of the torque converter 4 is calculated from a torque ratio t determined in accordance with a speed ratio between input and output speed, a torque capacity τ, and an engine speed Ne, as $t \times \tau \times Ne^2$. The required driving force is a driving force at a drive wheel, so that it is converted to an output torque of the torque converter by using the wheel radius, the final gear ratio, and the speed ratio of the transmission.

Accordingly, the target input speed (the engine 30 speed) N of the torque converter 4 is given by; $N = (TED0/GRBYRT/RATIO/TRQRTO/TAU)^{1/2}$. In this equation, TED0 is the driving force, GRBYRT is the final gear ratio/the wheel radius, RATIO is the actual speed ratio, TRQRTO is the torque ratio of the torque converter 4, and TAU is the capacity of the torque converter 4.

Figure 3:
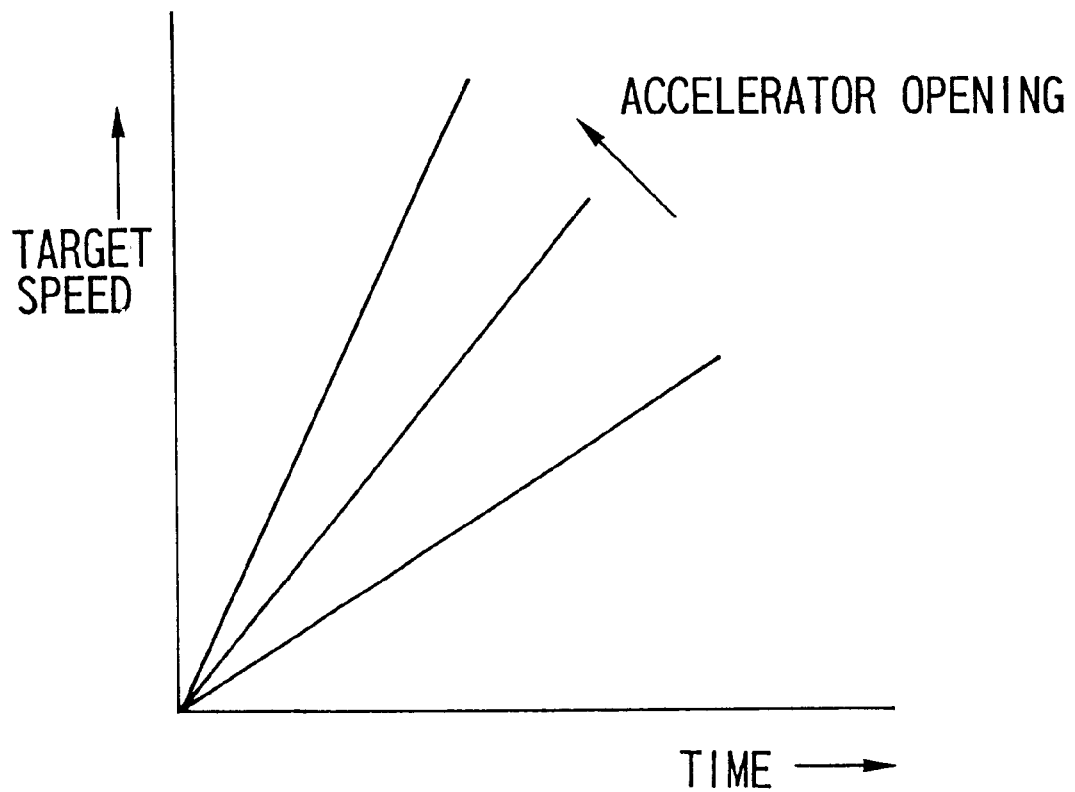
FIG. 3 is a graph showing a characteristic of a target engine speed used in the system of FIGS. 1 and 2.

Alternatively, it is possible to determine the target speed by lookup from a map as shown in FIG. 3, as a function of the depression degree (accelerator opening) of the accelerator pedal and the time from a start of the restarting operation (or the vehicle speed after the start of the restarting operation). As shown in FIG. 3, the target speed increases as the time from a start of the starting operation increases, and the rate of increase of the target speed increases as the accelerator opening increases.

After the start of the fuel supply, the engine 1 produces a torque. Therefore, the target speed used in this control is based on a sum of the torque of the engine 1 and the torque of the motor/generator 2. If the engine speed increases excessively by the torque of the engine 1, the motor/generator 2 serves as a load by functioning as an electric generator and thereby prevents the engine speed from increasing beyond the target speed.

This control system restarts the engine 1 without changing the shift position of the automatic transmission 3. When the automatic transmission 3 is in the D range, this control system holds the automatic transmission 3 invariably in the D range during the restart operation, and produces the force of creep corresponding to the idle speed, from the beginning if the accelerator pedal is not depressed. If the automatic transmission 3 is in the N range, the control system controls the input speed of the automatic transmission 3 equal to the idle speed without providing the creep. In any case, this control system does not produce a shock due to a return to the D range from the N range as in a conventional system.

When the select position of the automatic transmission 3 is in the R range, the controller 10 proceeds from the step S8 to a step S29 and examines, at the step S29, whether the engine 1 is in the stop state. When the engine 1 is in the stop state, the controller 10 proceeds to a step S30, and checks the flag FRFST reset at the step S9 to determine whether this is the first operation in the R range mode. In the case of the first operation in the R range mode, FRFST=0, and hence the controller 10 proceeds to a step S31. At the step S31, the controller 10 sets a delay time (2 seconds, for example) for engine stoppage, and sets the flag FRFST to one (FRFST=1).

At the end of the delay time set at the step S31, the controller 10 proceeds from the step S32 to the step S22 and starts the engine restart operation of the steps S22~S28 and S33~S36.

Figure 4:
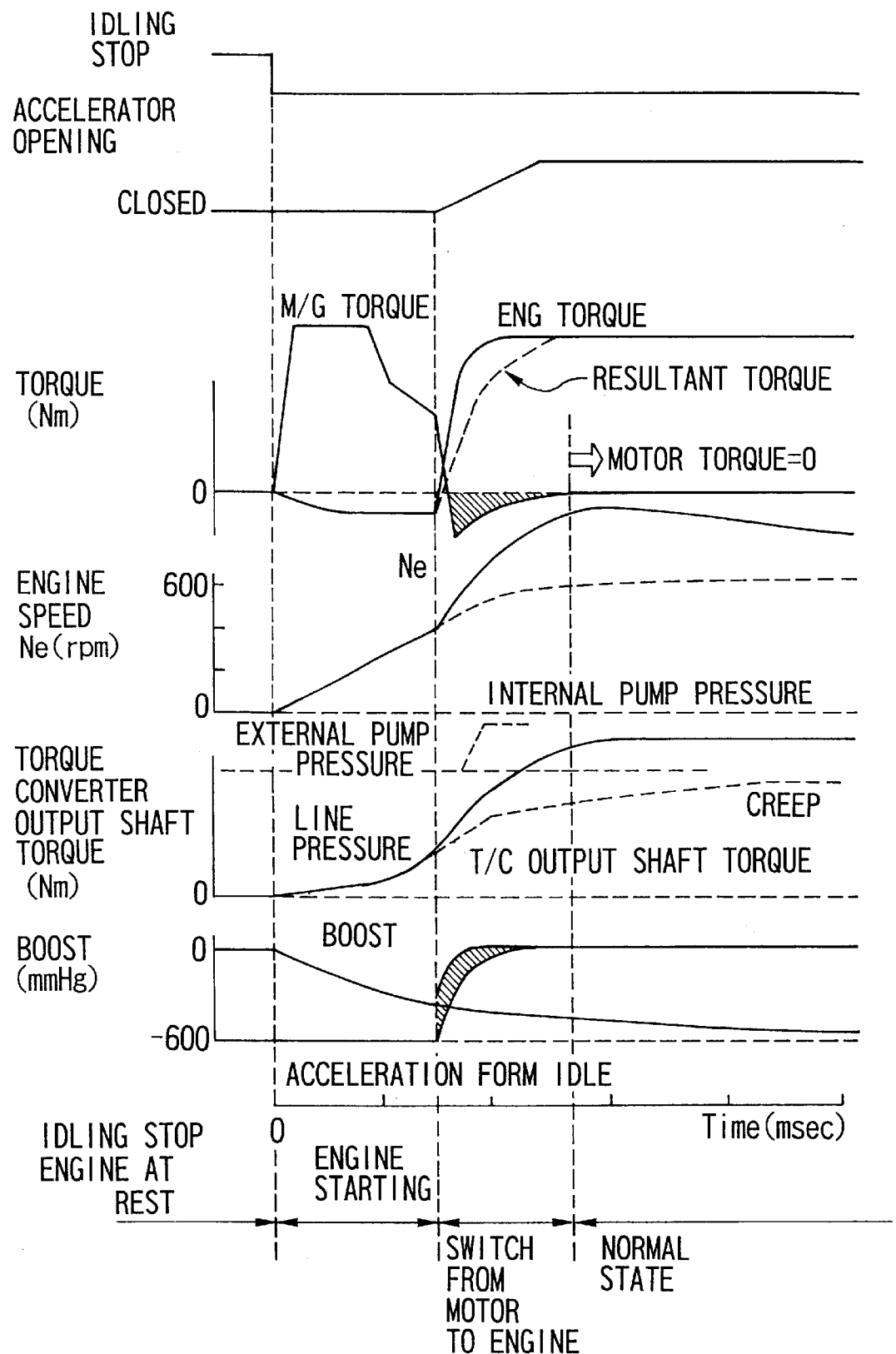
FIG. 4 is a time chart for illustrating operations of the automatic engine stop and restart system of FIGS. 1 and 2.

FIG. 4 illustrates operations of the control system according to this embodiment. The feature of this automatic engine stop and restart system according to this embodiment resides in the engine restart control.

In the example of FIG. 4, the stop and restart system restarts the engine 1 in the D range. When the driver releases the brake pedal in the automatic stop state in which the engine is automatically stopped, the system terminates the idling stop operation, and starts the cranking operation of the engine 1 with the motor/generator 2.

The motor/generator 2 forcibly turns the engine 1, and accordingly the torque converter 4 produce the creep force. Even when the engine 1 is in the stop state in which the engine is stationary, the external oil pump 14 supplies the oil pressure, so that the line pressure in the automatic transmission 3 is held at the normal level. Therefore, in the D range, the CVT unit 6 is in the drive state with the variable pulley pressure held at a level maintaining the driving connection without slippage of the metal belt 6, and the forward clutch of the forward reverse mechanism 5 is held in the engaged state. This system prevents the oil pressure from becoming excessive and thereby minimizes the loss of driving the pump to protect the fuel economy.

At the end of a predetermined short time (1.5 second, for example) after the start of the engine cranking operation, the system starts the fuel injection, so that the engine torque increases. The predetermined short time is a time required to develop an engine boost to a level of about −400 mmHg (≅48 kPa). In this way, this system waits for a build up of engine boost, and then starts the fuel injection, so that the combustion torque is relatively small, and the torque is varied smoothly from the torque of the motor/generator 2 to the torque of the engine 1. This system controls the sum of the engine torque and the motor/generator torque so as to make the sum equal to the target driving torque.

In the state in which the engine torque increases sharply, the input speed of the automatic transmission 3 tends to increase beyond the target speed in the manner of overshoot. In this case, the motor/generator 2 is operated as a generator, and absorbs an excess of the engine output so that the produced torque becomes equal to the target torque and the creep force is held at a desired value.

After the engine 1 has reached the state of self-supporting revolution, the system returns the engine to the normal operating state when the actual engine speed increases to the target engine speed and the required motor torque becomes zero.

During this engine restarting operation, the select position of the automatic transmission 3 is held unchanged. When, for example, the select position is in the D range, the engine 1 is restarted in the D range, and the creep force is produced from the start of the engine starting operation, first by the motor/generator 2 and then by the engine 1. Therefore, this system can prevent unnatural feeling, and a shock which would be caused if the transmission is held in the neutral state and returned to the drive range.

When the engine 1 is restarted in the N range, this system produces no creep force. In this case, however, the driver is aware that the select position is in the N range, and anticipates a shock due to a shift from the N range to the D range as usual.

When the engine 1 is restarted in the state in which the accelerator pedal is depressed by the driver, this system can increase the driving force rapidly as demanded by the driver. In this case, the control system sets the target speed in the restarting operation so that the target speed increases as the accelerator opening increases, and the target speed increases as the time from the start of the engine starting operation or the vehicle speed increases. Since the engine speed cannot increase immediately, the control system increases the torque of the motor/generator 2. Therefore, the motor/generator 2 increases its speed sharply while rotating the engine 1, and thereby produces the driving torque as requested by the driver. The control system reduces the output of the motor/generator 2 to zero when the engine speed reaches the target speed. The motor/generator 2 produces electric energy by consuming the engine torque when the battery 13 is to be charged, or when a regenerative operation is required during deceleration.

Figure 5:
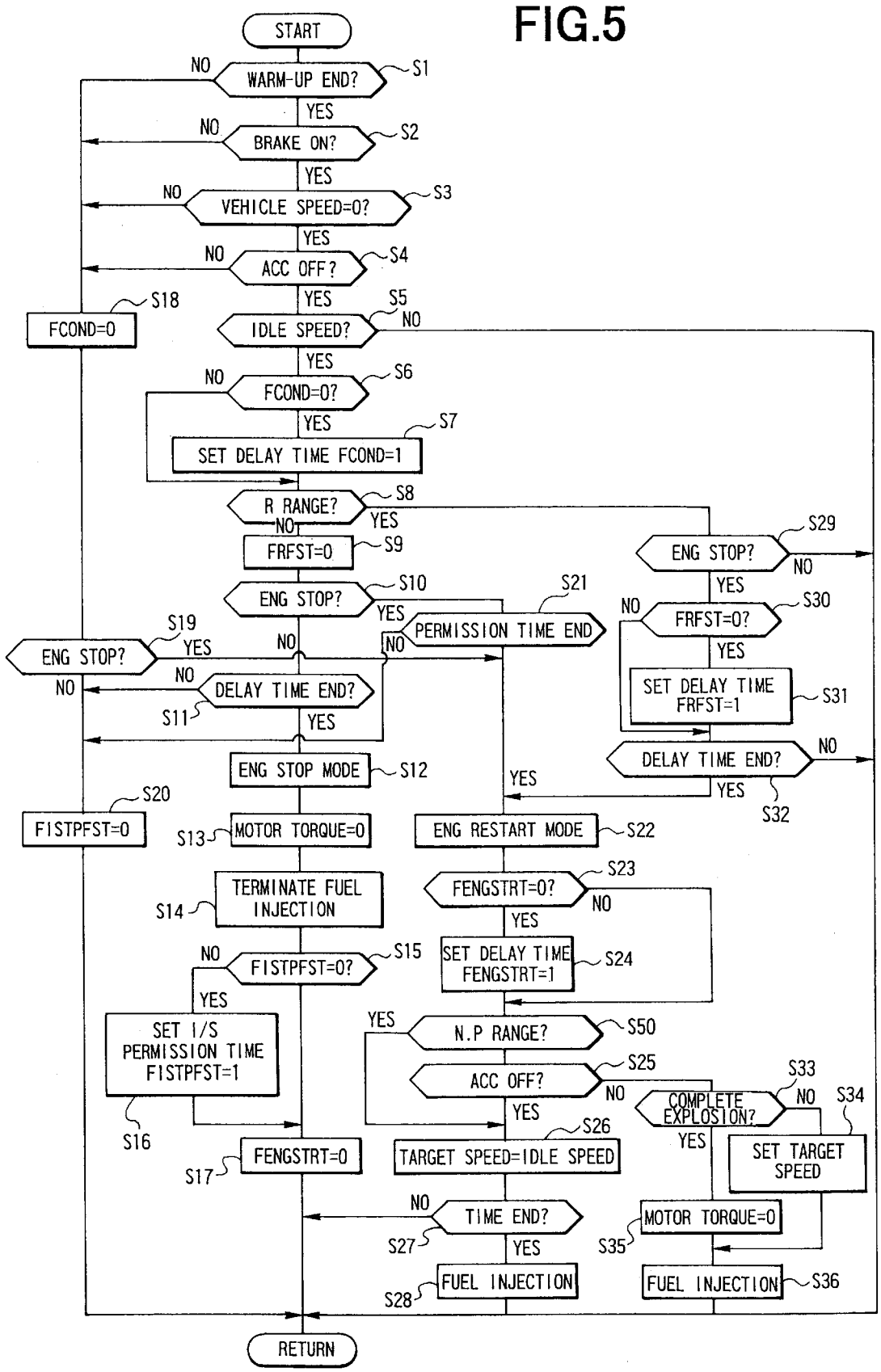
FIG. 5 is a flowchart for showing a control process according to another embodiment of the present invention.

FIG. 5 shows a control process according to a second embodiment of the present invention. The control process of FIG. 5 is different from FIG. 2 only in the addition of a step S50 between the step S24 and the step S25. At the step S50, the controller 10 checks the driving condition of the automatic transmission 3. In this example, the controller 10 proceeds from the step S50 directly to the step S26 if the automatic transmission 3 is in the N or P range. Otherwise, the controller 10 proceeds from the step S50 to the next step S25. Therefore, in the example of FIG. 5, the target engine speed is set at the idle speed in the case of the N or P range, without regard to the accelerator opening degree.

The system according to the second embodiment can prevent the engine speed from being increased even if the driver races the engine in the N or P range. This adds a contribution to the improvement of fuel economy and reduction of noises. On the other hand, the control system according to the first embodiment can provide a natural feeling as in an ordinary vehicle, by allowing the engine speed to increase in response to depression of the accelerator pedal in the N or P range.

This application is based on a Japanese Patent Application No. 11-76223. The entire contents of this Japanese Patent Application with a filing date of Mar. 19, 1999 are hereby incorporated by reference.

The present invention is not limited to the embodiments described above. Modifications and variations of the embodiments described above will occur to those skilled in the art in light of the above teachings.

What is claimed is:

1. A vehicle comprising:

an engine;

a motor for starting the engine;

an automatic transmission connected with the engine and the motor, for receiving input rotation from the engine and the motor and providing output rotation to drive the vehicle;

a sensing device for sensing a vehicle operating condition; and a controller for performing an automatic engine stop operation for automatically stopping the engine and an automatic engine restart operation for automatically restarting the engine in accordance with the vehicle operating condition, for producing an engine restart request signal to request a restart of the engine during the automatic engine stop operation, for determining a target engine speed for the automatic engine restart operation, and for performing the automatic engine restart operation, in response to the engine restart request signal, by driving the motor in accordance with the target speed while holding a transmission state of the automatic transmission unchanged.

2. A vehicle according to claim 1 wherein the controller is configured to perform the automatic engine restart operation in response to the engine restart request signal, and to hold the automatic transmission in a drive range during the automatic engine restart operation if the automatic transmission is in the drive range at the start of the engine restart operation.

3. A vehicle according to claim 1 wherein the controller produces a first condition signal when an accelerator pedal of the vehicle is depressed, a second condition signal when a brake pedal of the vehicle is released, a third condition signal when a vehicle speed of the vehicle is increased from zero, and a fourth condition signal when a time duration of the automatic engine stop operation becomes equal to or greater than a predetermined time length, and the controller produces the restart request signal when at least one of the first, second, third and fourth condition signals is produced.

4. A vehicle according to claim 3 wherein the sensing device comprises an accelerator sensor for sensing a condition of the accelerator pedal of the vehicle, a brake sensor for sensing a condition of the brake pedal of the vehicle, and a vehicle speed sensor for sensing the vehicle speed of the vehicle, and the controller produces the first, second and third condition signals, respectively, in accordance with signals from the accelerator sensor, the brake sensor and the vehicle speed sensor.

5. A vehicle according to claim 1 wherein the controller determines the target engine speed for the automatic engine restart operation in accordance with an accelerator opening degree.

6. A vehicle according to claim 5 wherein the controller sets the target engine speed equal to an idle speed when the accelerator opening degree is equal to a minimum setting.

7. A vehicle according to claim 5 wherein the controller increases the target engine speed for the automatic engine restart operation in accordance with the accelerator opening degree.

8. A vehicle according to claim 5 wherein the controller increases the target engine speed for the automatic engine restart operation in accordance with an operating parameter which is one of a time elapsed from a start of the automatic engine restart operation and a vehicle speed of the vehicle.

9. A vehicle according to claim 8 wherein the controller increases a rate of increase of the target engine speed with respect to the parameter as the accelerator opening degree increases.

10. A vehicle according to claim 1 wherein the controller sets the target engine speed for the automatic engine restart operation equal to an idle speed when the transmission is in a non-driving state in which a driving torque is not transmitted through the transmission.

11. A vehicle according to claim 1 wherein the sensing device further comprises a transmission condition sensor for sensing a condition of the automatic transmission, and the controller checks the condition of the automatic transmission in response to the restart request signal and determines the target engine speed for the automatic engine restart operation in accordance with the condition of the automatic transmission.

12. A vehicle according to claim 1 wherein the controller controls a torque of the engine and a torque of the motor in the automatic engine restart operation so as to make an actual engine speed equal to the target speed.

13. A vehicle according to claim 12 wherein the sensing device comprises an engine speed sensor for sensing an actual engine speed of the engine, and the controller controls the motor in the automatic engine restart operation so as to reduce a deviation of the actual engine speed from the target engine speed.

14. A vehicle according to claim 13 wherein the controller operates the motor in a power generating mode for generating electric power by absorbing energy of the engine when the actual engine speed is higher than the target speed.

15. A vehicle according to claim 1 wherein, in the automatic engine restart operation, the controller first cranks the engine with the motor without fuel injection for a predetermined time duration to increase an engine boost to a predetermined level, and starts fuel supply to the engine at the end of the predetermined time duration.

16. A vehicle according to claim 1 wherein the vehicle further comprises an oil pump for supplying oil pressure to the automatic transmission even when the engine is at rest.

17. An automatic engine stop and restart control apparatus for automatically stopping an engine for a vehicle and automatically restarting the engine with a starting motor, the automatic engine stop and restart control apparatus comprising:

means for automatically stopping the engine in a predetermined vehicle situation;

means for producing an automatic restart request signal in accordance with a vehicle operating condition in the predetermined vehicle situation;

means for monitoring a driving condition of an automatic transmission connected with the engine;

means for determining a target engine speed for an automatic engine restart operation in accordance with the driving condition of the automatic transmission; and means for restarting the engine in response to the automatic engine restart request signal, by controlling the starting motor in accordance with the target engine speed.

18. An automatic engine stop and restart control process for automatically stopping an engine for a vehicle and automatically restarting the engine with a starting motor, the automatic engine stop and restart control process comprising:

putting the engine in an automatic stop state in a predetermined vehicle situation;

producing an automatic restart request signal in accordance with a vehicle operating condition in the predetermined vehicle situation;

detecting a driving condition of an automatic transmission connected with the engine;

determining a target engine speed for an automatic engine restart operation in accordance with the driving condition of the automatic transmission; and initiating the automatic engine restart operation for restarting the engine in response to the automatic engine restart request signal, by controlling the starting motor in accordance with the target engine speed.

* * * * *